July 8, 1941.  G. J. MOELLER  2,248,410
MOUNTING BRACKET
Filed Dec. 23, 1939

INVENTOR
GEORGE J. MOELLER
BY Lawrence H. Cohn
ATTORNEY

Patented July 8, 1941

2,248,410

UNITED STATES PATENT OFFICE 2,248,410

MOUNTING BRACKET

George J. Moeller, St. Louis, Mo., assignor to Dazey Churn and Manufacturing Co., St. Louis, Mo., a corporation of Missouri Application December 23, 1939, Serial No. 310,753

3 Claims. (Cl. 248—224)

This invention relates to improvements in adjustable mounting brackets for kitchen utensils, such as can openers, and the principal object of the invention is to provide an improved bracket structure of this character which is adapted to support the utensil in any one of several positions and which permits of the utensil being demounted as for purposes of storage.

The bracket structure of the present invention has particular application in connection with a can opener of a prevalent type which is customarily mounted on a kitchen wall and projects into the room. An object of my invention is to provide an improved mounting bracket for such a can opener which rigidly holds the same in a salient operating position, yet by which the can opener may be swung to and supported in a relatively unobtrusive position along the wall when not in use.

With the foregoing and other objects in view, the invention resides in the novel features of form, construction, arrangement and combination of parts presently described and pointed out in the claims.

Figure 1:
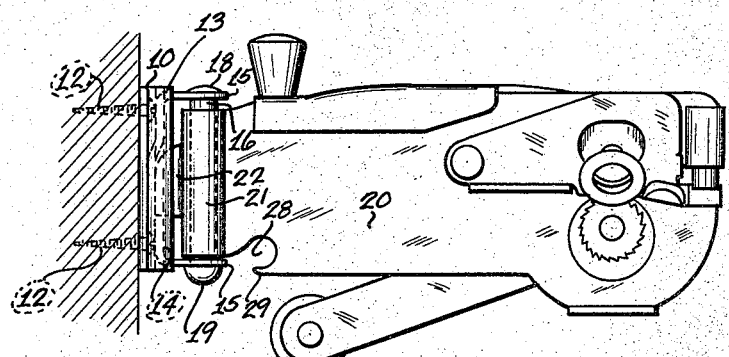
Figure 2:
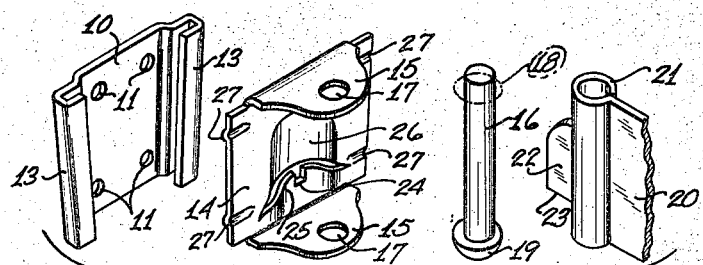
Figure 3:
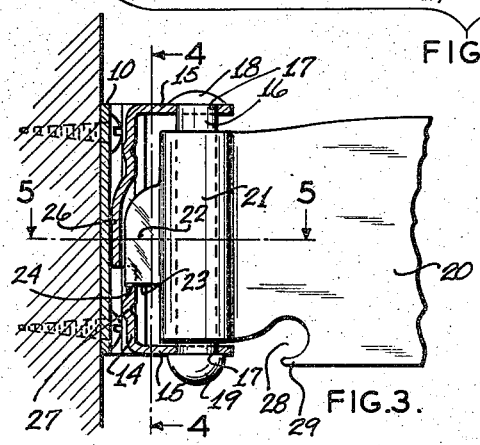
Figure 4:
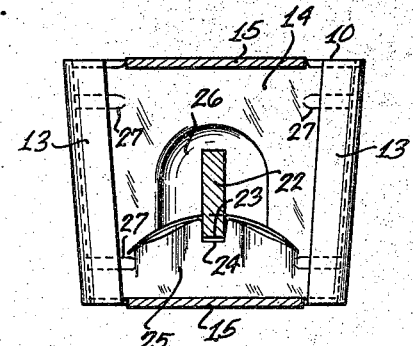
Figure 5:
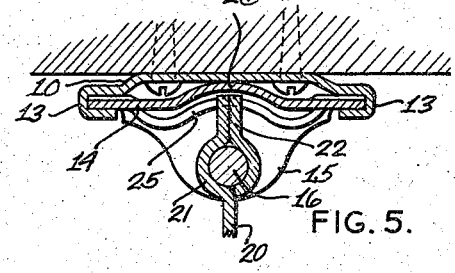

In the accompanying drawing, Fig. 1 is a side elevational view of a can opener equipped with the mounting bracket of my invention; Fig. 2 illustrates, perspectively, the several members which make up the bracket; Fig. 3 is a side elevation of the bracket assembly, certain parts of which are shown in section; Fig. 4 is a vertical sectional view taken at line 4—4 of Fig. 3, and Fig. 5 is a horizontal sectional view taken at line 5—5 of Fig. 3.

Referring now by characters of reference to the drawing, numeral 10 designates a wall plate provided with apertures 11 for the reception of screws 12 by which the plate may be fixedly secured to a wall or other support. The side marginal portions of plate 10 are bent to form opposed channels 13 of downwardly converging trend, such channels being adapted to receive the opposite side margins of a generally trapezoidal base- or tenon-plate 14 which is attached in a manner to be described to the frame of the can opener or other kitchen utensil.

Projecting forwardly from base plate 14 at its upper and lower edge are opposed, horizontal ears 15, to which are secured the upper and lower ends of a pintle 16 that extends vertically therebetween and which is spaced a substantial distance forwardly of the plane of the base plate. Pintle 16 extends through vertically alined apertures 17 in the ears 15 and is secured against endwise displacement by means of an enlarged head portion 18 formed at its upper end, and a prominent, semi-spherical boss 19, at its lower end and which, in assembly, subtends the lower ear.

Hinged to pintle 16 is the supporting arm of a kitchen utensil which, in the present example, is represented by a can opener. Such arm consists of a flat, elongated plate 20 whose inner end is bent to tubular form as indicated at 21 and through which pintle 16 extends. The length of the tubular hinge part 21 is substantially less than the distance between ears 15 so that arm 20 is susceptible of vertical displacement as well as horizontal pivotal movement with respect to the base plate 14.

As a means for holding arm 20 in a fixed angular position with respect to base plate 14, there is formed on arm 20 a tail-like extension or locking tongue 22 which projects rearwardly from the tubular hinge part 21. The lower horizontal edge 23 of tongue 22 is adapted to seat in a notch 24 formed in an upwardly directed lip 25 which is struck from plate 14, the notch 24 being located at the apex of the convexly curved upper edge of such lip. As best appears from Fig. 5, lip 25 is displaced from the plane of plate 14 and is arcuate in transverse aspect, its center of transverse curvature lying in the pivotal axis of arm 20. The portion 26 of plate 20 above lip 25 is off-set rearwardly in the formation of a pocket or recess to accommodate the locking tongue 22.

From the foregoing description it will be understood that wall plate 10 is permanently secured to a wall or the like, and the can opener or other utensil is adapted to be connected thereto by inserting the lower corner portions of base plate 14 into the upper ends of the wall plate channels 13, then sliding the base plate downwardly until the same is firmly wedged between the sloping inner surfaces of the said channels. To provide for a rigid connection between plates 10 and 14 and yet reduce the extent of their surface interengagement so that they may be readily disconnected, the side margins of the base plate 14 are deformed to produce spaced transverse ridges 27 that make line contact with the inner surfaces of the channels 13. Obviously, wall plate 10 may be dispensed with entirely and suitable provisions made for effecting permanent securement of base plate 14 to a wall or the like. The use of a separable wall plate as described herein is to be preferred, however, since it may be employed as an anchorage common to a number of different utensils having like mounting provisions.

When the utensil is being used the normal position of bracket arm 20 is at right angles to base plate 14 and to the wall, being rigidly so held by the interengagement of tongue 22 and the notched portion of lip 25. Disengagement of these parts to permit of the utensil being swung to an unobtrusive position along the wall is readily accomplished by raising the bracket arm 20 relative to its base plate 14 to disengage tongue 22 from the lip notch 24, whereafter the arm may be swung to either side of the normal plane. When it is desired to restore the utensil to operating position, appropriate pivotal movement thereof is all that is necessary since lip 25 exerts a camming force on tongue 22 which acts to raise the tongue 22 for subsequent introduction into notch 24.

Bracket arm 20 is shown provided with a recess 28 in its lower edge, such recess defining a curved finger 29 which is directed toward and acts in conjunction with the boss 19 in the provision of means for removing bottle caps.

Having thus described my invention, what I claim as new and desire to secure by Letters Patent is:

1. A swingable mounting bracket for a kitchen utensil, comprising a plate adapted for securement flatwise to a support, said plate having vertically spaced ears projecting forwardly from the outer face thereof, a vertical hinge pin secured at its ends to said ears, said plate having a recess the lower margin of which defines a lip having a convex upper edge, a notch formed in the apex portion of said lip, a bracket arm formed of sheet metal and mounted for horizontal swinging movement about, and vertical displacement along said hinge pin, an integral, rearwardly projecting locking tongue formed on said bracket arm, said tongue being adapted lockingly to seat in said notch when the bracket arm is disposed at right angles to said plate, said lip acting cammingly on said tongue to elevate the same for subsequent introduction into said notch when the bracket arm is swung from a lateral to a right angular position with respect to said plate.

2. A swingable mounting bracket for a kitchen utensil, comprising a plate adapted for securement flatwise to a support, vertically spaced ears projecting forwardly from the outer face of said plate, a vertical hinge pin carried by said ears, an arcuate lip struck from the material of said plate, said lip having its center of curvature located substantially in the axis of said hinge pin, the upper edge of said lip being convexly curved and having a notch formed in the apex thereof, a sheet metal bracket arm mounted for horizontal swinging movement about and vertical displacement along said hinge pin, said bracket arm having a rearwardly projecting tongue portion adapted to ride upon the upper edge of said lip and to seat lockingly in said notch when the bracket arm is disposed at right angles to the plate, said bracket arm, when swung from a lateral to a right angular position with respect to said plate being cammed upwardly by said lip to permit said tongue portion to enter said notch.

3. A swingable mounting bracket for a kitchen utensil, comprising a hinge plate adapted for securement to a support, ears projecting forwardly from said plate, a bracket arm formed of sheet metal, a vertical hinge pin swingably connecting said bracket arm to said ears, said bracket arm being adapted for vertical displacement relative to said hinge plate, said hinge plate having a recess formed in its forward face, the material of said hinge plate subtending said recess being deformed to provide an arcuate lip having its center of curvature located substantially in the axis of said hinge pin, said lip having a convexly curved upper edge and a notch formed in the apex thereof, said bracket arm having a rearwardly projecting locking tongue adapted to extend into said recess and seat in said lip notch when said bracket arm is disposed at right angles to said hinge plate, said lip acting to cam said bracket arm upwardly to permit the locking tongue to enter said notch when the bracket arm is swung from a lateral to a right angular position with respect to said hinge plate.

GEORGE J. MOELLER.